Figure 4:
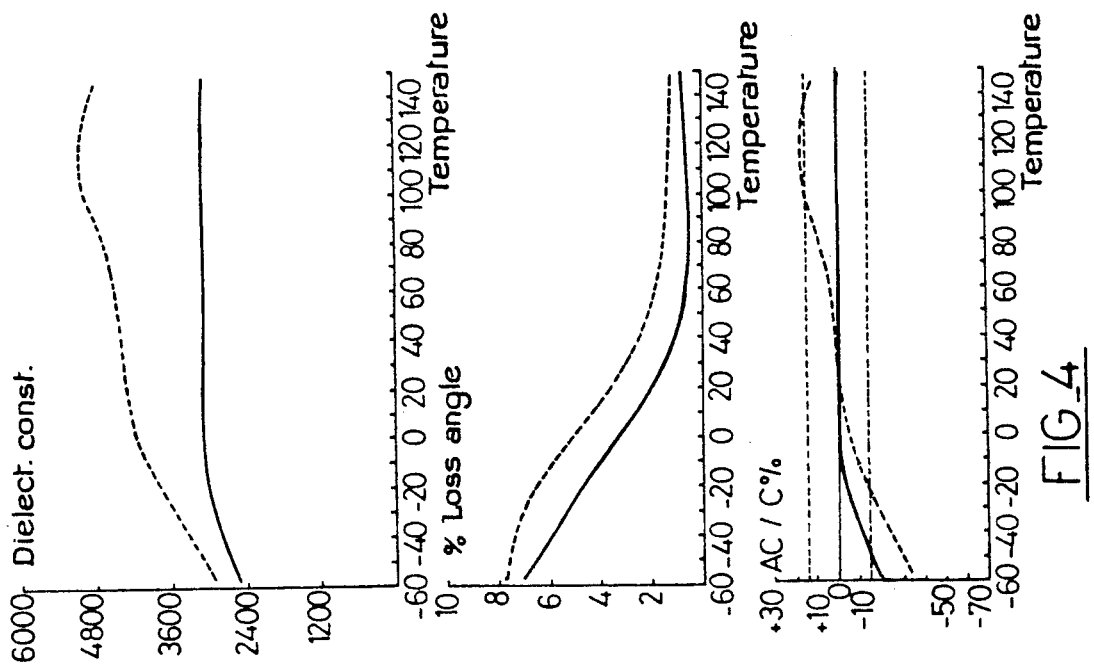

United States Patent [19]

Raveau et al.

[11] Patent Number: 5,037,784
[45] Date of Patent: Aug. 6, 1991

[54] CERAMIC COMPOSITION CONTAINING A TUNGSTEN TETRAGONAL BRONZE PHASE WITH A HIGH DIELECTRIC CONSTANT

[75] Inventors: Bernard Raveau, Beuville; Gilbert Desgardin, Herouville St Clair; Brahim Boufrou, Herouville, all of France

[73] Assignee: Centre National De La Recherche Scientifique, Paris, France

[21] Appl. No.: 550,320

[22] Filed: Jul. 9, 1990

[51] Int. Cl.$^5$ .............................................. C04B 35/46
[52] U.S. Cl. .................... 501/134; 501/135; 501/136; 501/137; 501/138; 501/139
[58] Field of Search ............... 501/134, 135, 136, 137, 501/138, 139

[56] References Cited

U.S. PATENT DOCUMENTS 4,244,722  1/1981  Tsuya et al. .................. 501/134
4,946,810  8/1990  Heistand, II et al. ............ 501/136

Primary Examiner—William R. Dixon, Jr.
Assistant Examiner—Sue Hollenbeck
Attorney, Agent, or Firm—Blakely, Sokoloff, Taylor & Zafman

[57] ABSTRACT

The invention relates to a ceramic composition.

It comprises at least one phase of a structure derived from that of tungsten tetragonal bronze and at least one phase of a structure derived from Perovskite.

Application to the electrical and electronics industry.

6 Claims, 7 Drawing Sheets

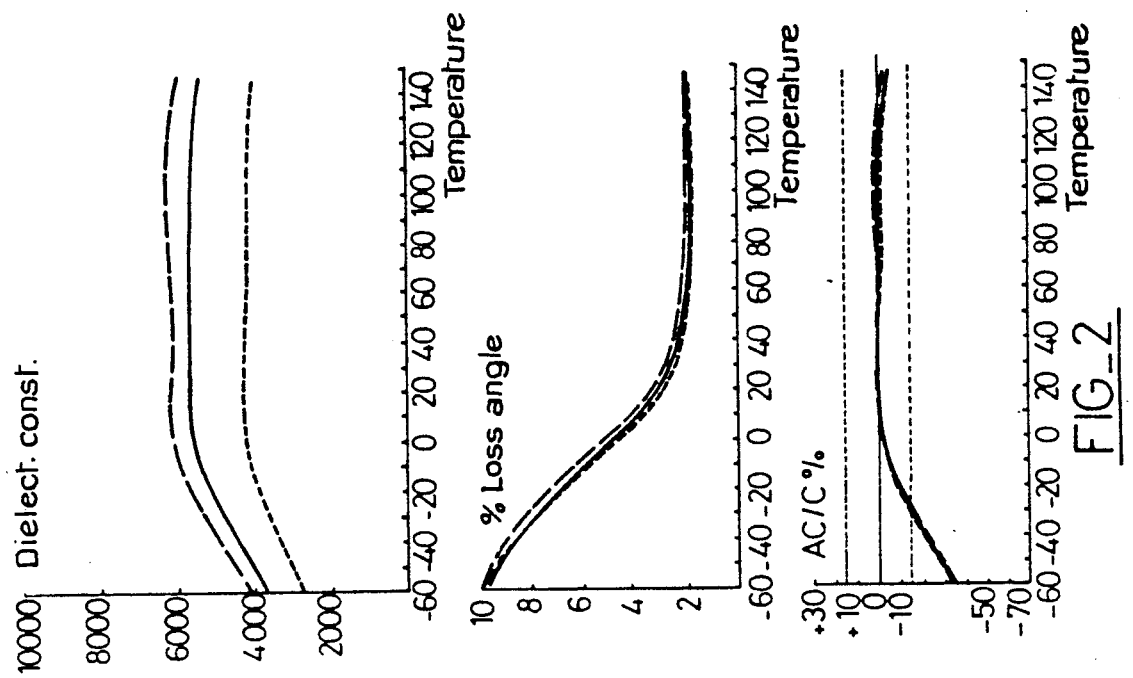
FIG_1
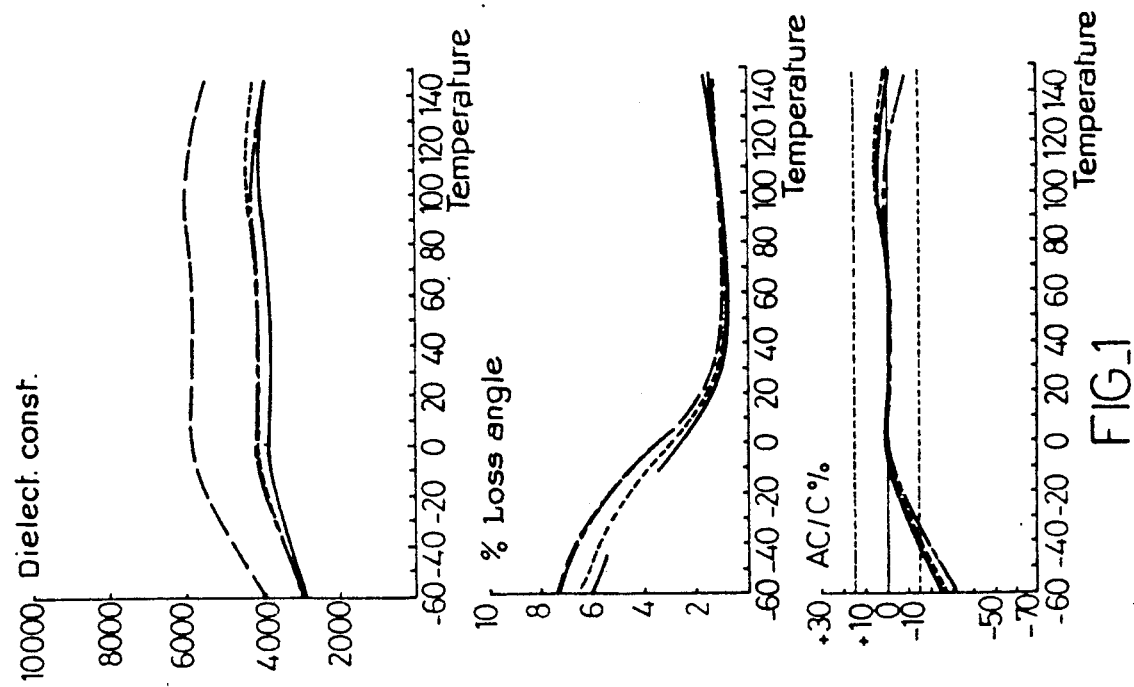
FIG_2

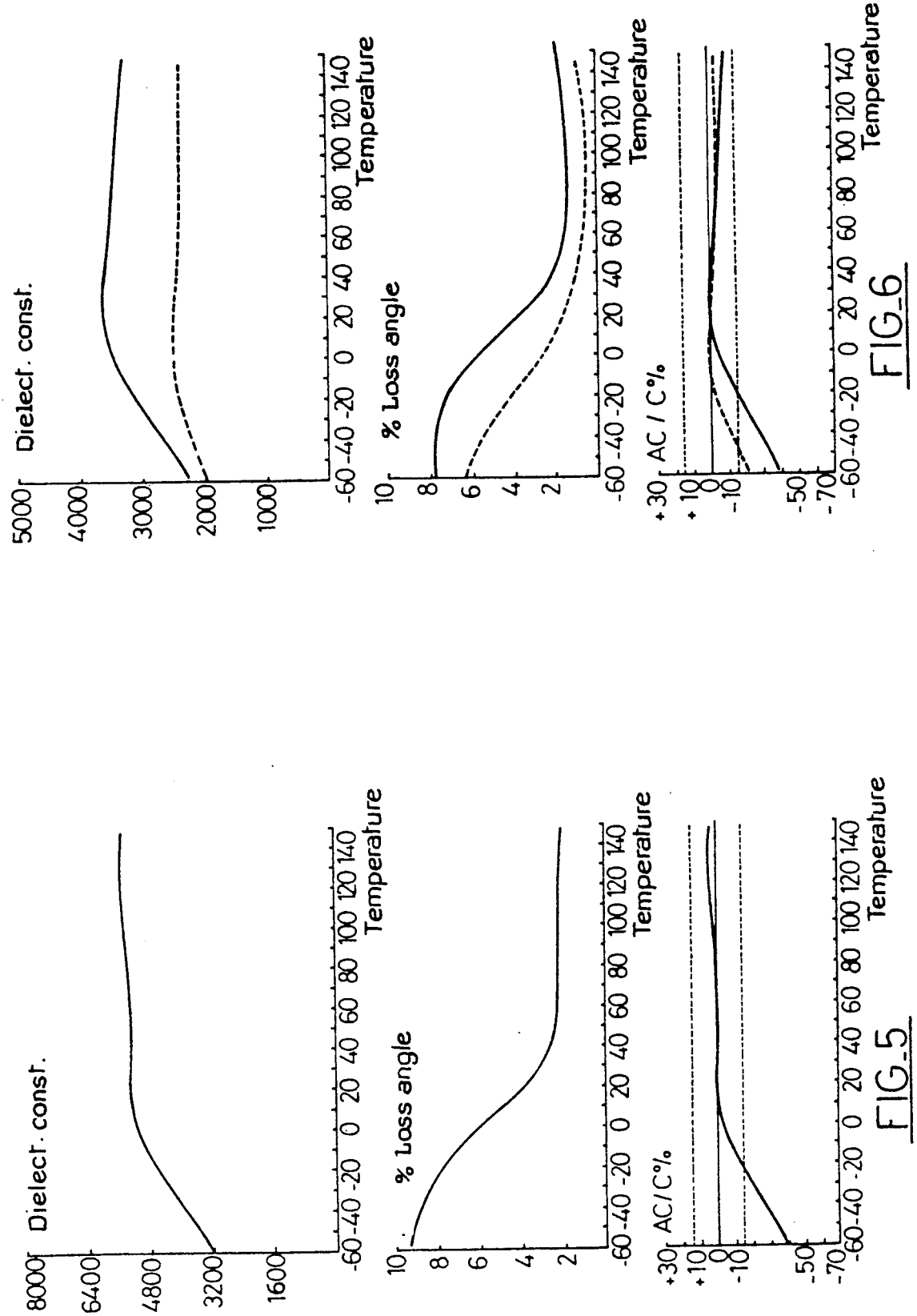

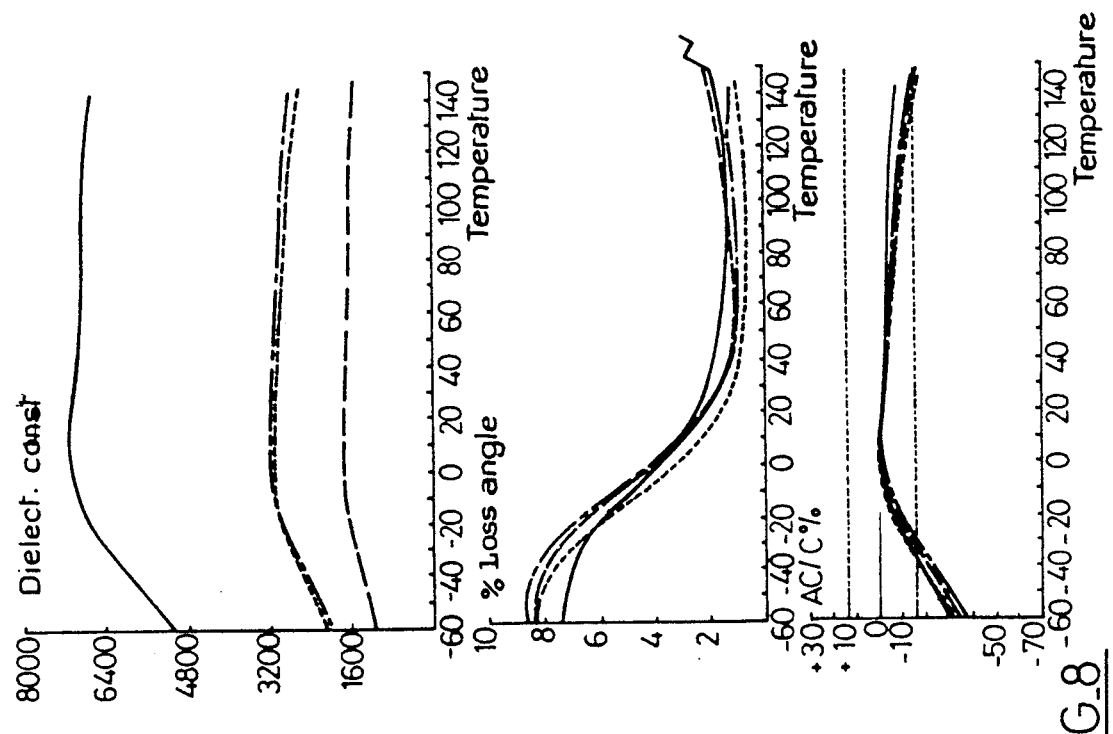
FIG_8
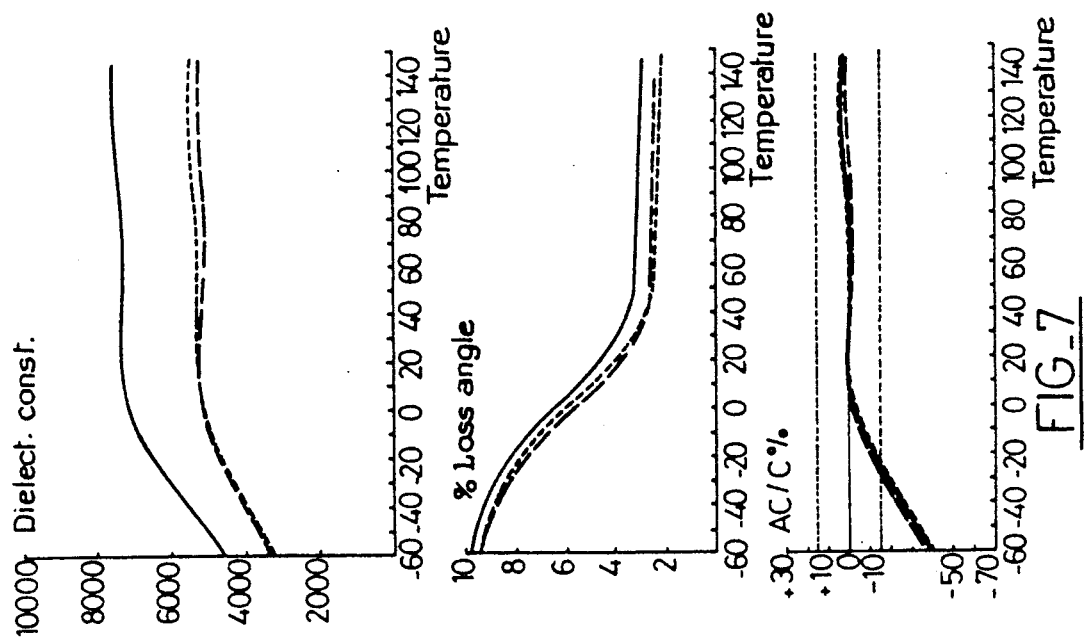
FIG_7

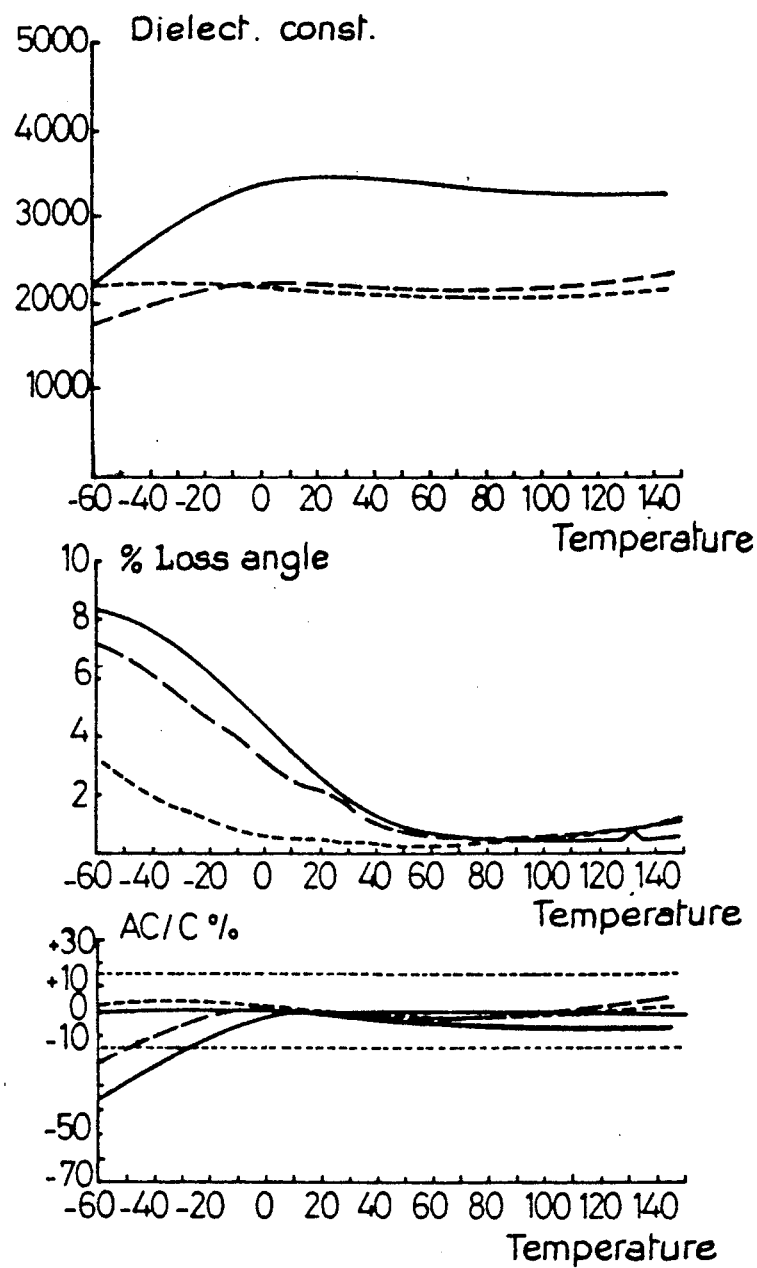
FIG_9

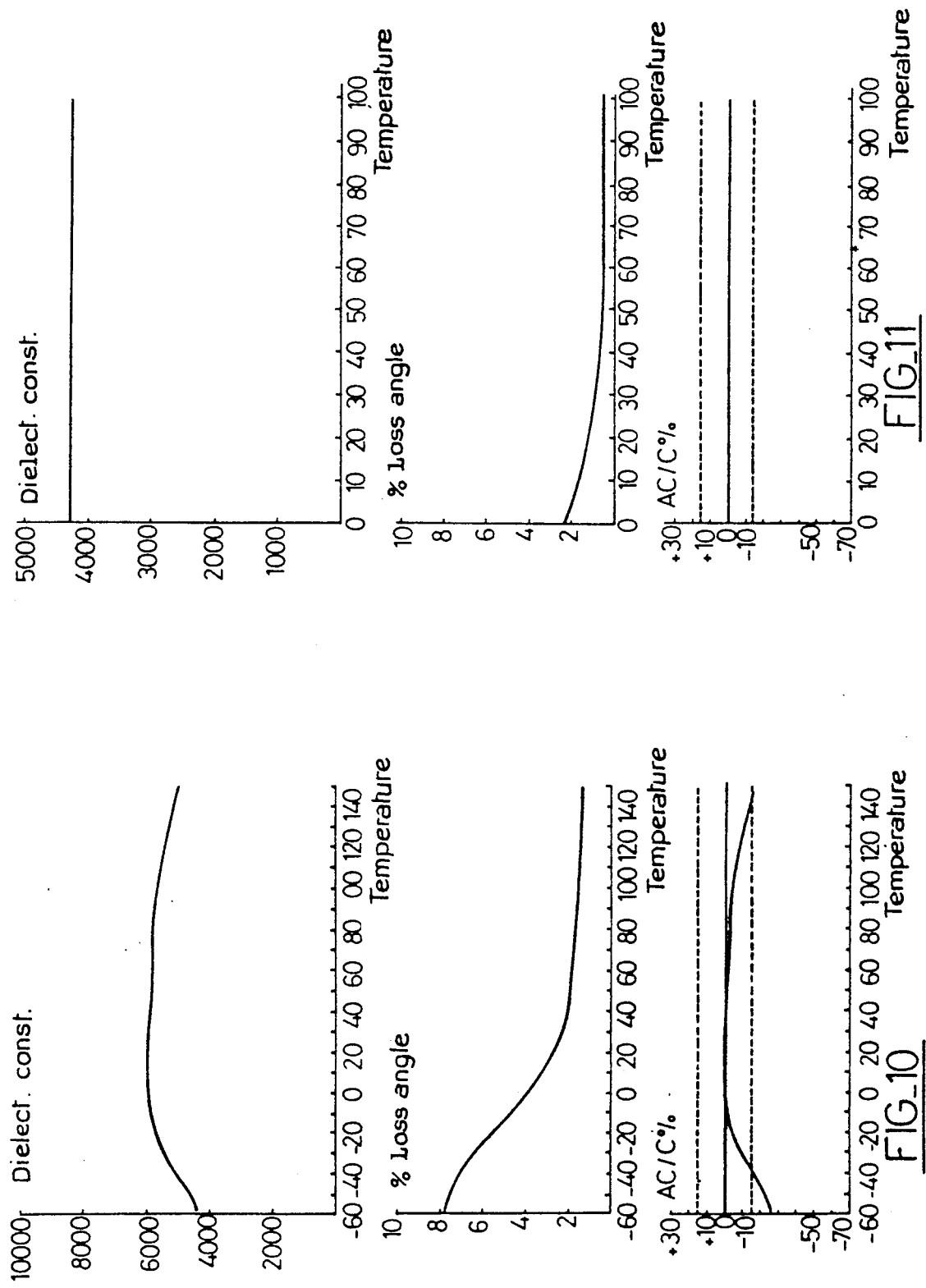
FIG_11
FIG_10

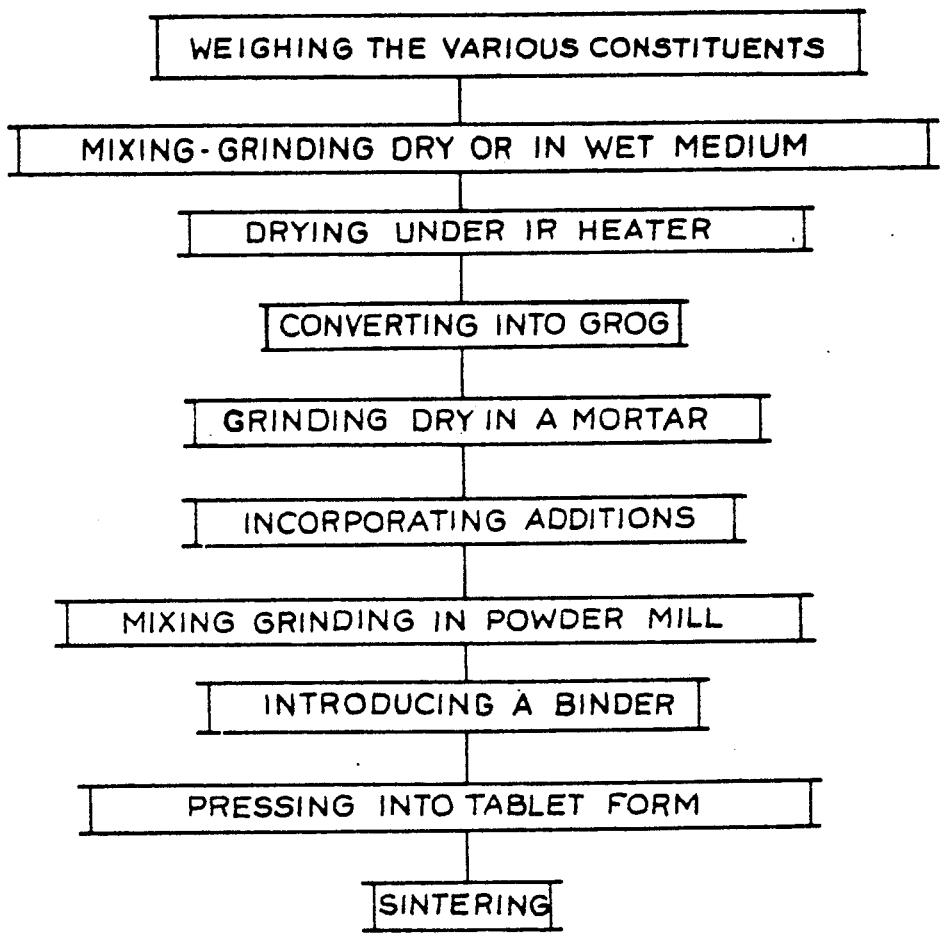
FIG_12

CERAMIC COMPOSITION CONTAINING A TUNGSTEN TETRAGONAL BRONZE PHASE WITH A HIGH DIELECTRIC CONSTANT

The present invention relates to new ceramic compositions and more particularly ceramic compositions which have a high dielectric constant (epsilon) and which are relatively stable with temperature. In the remainder of the present description the term dielectric constant is taken in the sense of relative permittivity.

Miniaturized ceramic capacitors have been extensively developed during the last decade.

This miniaturization has been accompanied by research to compensate the loss in capacity due to the miniaturization, by modifying either the geometry of the capacitor or its constituent materials.

In a first step, efforts were concentrated on reducing the thickness between the two plates; however, a limit appears to exist in the region of 10 micrometers. Then, to overcome this obstacle, new dielectrics whose constant may be very high have been investigated.

In particular, efforts have been concentrated on employing ceramic compositions exhibiting ferroelectric domains which exhibit a very high dielectric constant in the neighborhood of the Curie peak (or point).

However, this high dielectric constant varies very rapidly as a function of temperature and makes it necessary for the dielectric to be maintained at temperatures in the region of the Curie peak.

This question of the temperature sensitivity of the dielectric constants has led to various classes of ceramic dielectrics being defined according to their properties as a function of temperature.

The commercial class Z5U merely requires that the variation should remain within the limits of $+15\%$ to $-60\%$ relative to the nominal value at 25° C. for temperatures of between $+10°$ and $+85°$ C. The highest-performance class (class X7R) requires that there should be only a variation of $+$ to $-15\%$ about the nominal value in the temperature range from $-55°$ C. to $+125°$ C. There are slightly less demanding classes, such as Y7R (from $+$ to $-15\%$; from $-30°$ C. to $+125°$ C.), or slightly different ones, such as X7S (from $+$ to $-22\%$; from $-55$ to $+125°$ C.), X7T ($-33$ to $22\%$; from $-55$ to $+125°$ C.), X7S (from $+$ to $-22\%$; from $-30°$ C. to $+125°$ C.), Y7T ($-33$ to $+22\%$; from $-30°$ C. to $+125°$ C.) and Y7P (from $+$ to $-10\%$; from $-30°$ C. to $+125°$ C.).

Quite obviously, a corollary of this uniformity of performance is a lower value of the dielectric constant.

By way of indication, the best dielectrics obtained at the present time as a flat curve are based on $BaTiO_3$, plus $Nb_2O_5$ with the addition of some lanthanides. They correspond to an epsilon of the order of 3000 to 4000.

Furthermore, there is no dielectric which has very high performance.

This is why one of the objectives of the present invention is to provide ceramic compositions which exhibit a high dielectric constant which varies as little as possible as a function of temperature.

Another objective of the present invention is to provide one of the compositions of the preceding type, which fits into at least one of the categories listed above.

Another objective of the present invention is to provide compositions of the preceding type, which make it possible to attain values of epsilon equal to at least $4 \times 10^{-3}$, preferably to at least $6 \times 10^3$.

Lastly, another objective of the present invention is to provide a composition of the preceding type, whose manufacturing cost is reasonable.

These objectives, and others which will become apparent hereinafter, are achieved by a ceramic composition which comprises at least one phase of a structure derived from tetragonal tungsten bronze and at least one phase of a structure derived from perovskite.

The cohesion of the ceramic composition is advantageously ensured by the formation of at least a partial solid solution between its phases. This solid solution may be a solid solution of perovskite structure, but the phases derived from the tetragonal tungsten bronze structure and the phases with a structure derived from perovskite are preferably bonded together by a solid solution with a structure derived from tungsten bronze of tetragonal structure.

The said ceramic composition advantageously contains lithium in the form of an oxide or of an oxygen compound, or even of a halogen, preferably fluorine, compound. The lithium content, expressed as the weight of lithium oxide, does not exceed 1%, is preferably at least 0.05%, generally higher than or equal to 0.1% and lower than or equal to $\frac{2}{3}$ of a percent.

The phases with the structure derived from perovskite and aimed at by the invention are in general phases which have a dielectric constant, that is to say one at least equal to approximately $6 \times 10^3$ and a nonconductive one. An example of such phases which may be given are those which, referred to as "lead perovskites" are described especially in the paper "Ceramics: Composite materials for electronics" by J. M. Haussonne of CNET Centre Lannion B, given at the TEC88 Conference in Grenoble on Oct.12, 1988.

These structures are derived from perovskite by replacing the alkaline-earth metal with lead (essentially in the plumbous state) and the titanium by, on the one hand, one or more metals of valency V for which the size of the oxidized system is close to that of the titanate, preferably niobium, tantalum and their mixtures, and, on the other hand, one or more metals of valency II or III, such as, for example, the alkaline-earth ones of the magnesium type and the metals of the first transition series of the iron type. The corresponding quantities between the metals of valency V and the metals of valency II or III are such as to make the average valency substantially equal to IV, that is to say the valency of the titanium in perovskite.

Among the lead perovskites which have been found particularly advantageous, there may be mentioned:

the perovskite of formula $PbMg_{\frac{1}{3}}Nb_{\frac{2}{3}}O_3$ with a dielectric constant of 12,000, measured at the Curie point $Tc = -12°$ C.;

the perovskite $PbFe_{\frac{1}{2}}Ta_{\frac{1}{2}}O_3$ whose dielectric constant is equal to 20,000, measured at the Curie point $Tc = -40°$ C.; and the perovskite $PbMg_{\frac{1}{3}}Ta_{\frac{2}{3}}O_3$ whose critical temperature is $-98°$ C. and whose the dielectric constant at this temperature is 6800.

The tetragonal bronzes are advantageously chosen from those whose dielectric constant is equal to at least $1 \times 10^3$ and whose Curie temperature does not exceed approximately 300° C., and is preferably between 50° and 200° C.

These tetragonal bronzes generally consist of a macrolattice comprising 30 oxygen atoms, into which are inserted, on the one hand, 4 atoms of alkaline-earth metal or of closely related metals such as lead and, on the other hand, 2 alkali metal atoms and 10 atoms of valency V such as niobium and tantalum; an alkali metal atom and an atom of valency V can be replaced by a divalent atom of the above type (alkaline-earth metal, etc) and a tetravalent metal atom such as titanium. A replacement of this kind can take place twice.

Thus, as an example of tetragonal bronze which can be employed according to the present invention, there may be mentioned:

|  | value | Tc (0° C.) |
| --- | --- | --- |
| (1) $Ba_4K_2Nb_{10}O_{30}$ | 2000 | 302 |
| (2) $Sr_4Na_2Nb_{10}O_{30}$ | 1500 | 192 |
| (3) $Sr_4K_2Nb_{10}O_{30}$ | 800 | 160 |
| (4) $Pb_4K_2Nb_{10}O_{30}$ | 800 | 140 |
| (5) $Sr_6Nb_8Ti_2O_{30}$ | 675 | 100 |
| (6) $BaSr_3K_{0.5}Na_{1.5}Nb_{10}O_{30}$ | 890 | 178 |
| (7) $Ba_3SrK_{1.5}Na_{0.5}Nb_{10}O_{30}$ | 565 | 205 |

The preferred compound which has the structure of tungsten tetragonal bronze is the bronze of formula $K_2Sr_4Nb_{10}O_{30}$ whose Curie temperature is approximately 160° C. for the literature and has an epsilon of approximately 800 in the case of this temperature.

During the tests which have led to the present invention, this tetragonal bronze, prepared according to the techniques which are described hereinafter, exhibited an epsilon of 2000 without addition and of 4000 with the addition of lithium (not exceeding 1% by weight expressed as $Li_2O$), the quantity employed being in general slightly below 2% by weight of $LiNO_3$ or $Li_2CO_3$) for a Curie temperature of approximately 120° C. This tetragonal bronze will be subsequently referred to by the abbreviation KSN.

The heterogeneity of the results given by the literature can be explained by the fact that the measurements have been carried out on a single crystal, which is anisotropic. The values are approximately 1000 in the case of the perpendicular epsilon and approximately 12,000 in the case of the parallel epsilon.

In particular, it should be noted that $BaTiO_3$ coupled with other perovskites can form part of the perovskites according to the present invention.

As will be described below, the solid solution which makes it possible to bond the phase with a structure derived from tungsten tetragonal bronze and the phase with a structure derived from perovskite, and which constitutes the continuous phase, is generally obtained by calcining and sintering the initial compounds. The proportion of the solid solution depends on the sintering conditions (time and temperature); this is why it is simpler to define the ceramic compositions according to the present invention using their composition before their sintering. A perovskite/tetragonal bronze ratio of between 2 and 0.5, preferably between 1.5 and 1 is generally employed, the ratio being expressed in moles. It is frequently desirable that there should be a number of phases of perovskite type within the ceramic composition according to the invention.

It should be explained what is meant by a mole in the case of the perovskite and tetragonal bronze structures. In the case of perovskite, this is the unit containing 3 oxygen atoms, that is to say ($ABO_3$); whereas in the case of the tetragonal bronze it is the unit containing 30 oxygen atoms which corresponds to the mole.

Some preferred subgroups of the compositions according to the present invention are specified in the examples.

A further subject of the present invention is a process for the manufacture of the ceramic compositions according to the invention. This manufacturing process comprises the following stages:

a) grinding and mixing the phases constituting the ceramic composition, b) sintering by a heat treatment.

Stage a) of grinding the constituents is advantageously conducted so as to obtain a particle size such as to make $d_{50}$ (it should be recalled that $d_{50}$ is the mesh which lets pass 50% by weight of a compound of specified particle size) lower than 10, preferably between 3 and 4 micrometers. To obtain particle sizes as small as this, any of the known relevant techniques may be employed, such as grinding by a wet route, grinding by a dry route and attrition. It is also preferable that $d_{100}$, that is to say the smallest mesh allowing 100% of the product to pass through should be smaller than approximately 10 micrometers. It is sufficient for this purpose to perform a classification by screening or by techniques involving the equivalence principles (elutriation, sedimentation, use of cyclones, and the like).

The sintering stage (b) is advantageously carried out by a heat treatment by heating the mixture to a temperature of 1100 to 1300, advantageously of 1150° to 1250° C. for a period which varies from approximately 1 hour to approximately ¼ of a day. The period is determined so that the formation of a solid solution between the phases of the tetragonal bronze type and the phases of perovskite type should progress sufficiently to ensure the cohesion of the ceramic composition, but that, on the other hand, the homogenization of composition should not have had time to take place, so that at the end of the heat treatment the various compositions whose Curie points extend from low temperatures (−50° C.) to near the highest temperatures (+125° C.) should coexist.

The temperature increases and decreases are preferably relatively small, of the order of 100 to 200° C./hour. It should be noted that the rate of cooling is not critical and may be conducted relatively fast.

The sintering atmosphere is preferably an atmosphere corresponding to atmospheric composition or one which is richer in oxygen. When the sintering is carried out at a pressure which is not that of the atmosphere, it is preferable that the partial oxygen pressure should be equal to at least 1/5 of an atmosphere ($1/5 \times 10^5$ Pa).

Finally, according to the present invention, it has been noted that the presence of lithium compounds, be they oxygenated compounds capable of giving lithia by pyrolysis or be they compounds of the fluorinated type, facilitated the sintering of these various phases. However, the lithium content, expressed as $Li_2O$ should not significantly exceed 1% by weight.

When it is desired to give precedence to the horizontality of the curve relative to the absolute value of the dielectric constant, it is preferable that the addition of lithium should take place at least partially in a fluorinated form. In fact, during the study which led to the present invention it was demonstrated that fluorine, preferably introduced in the form of fluorine perovskite such as $BaLiF_3$ made it possible to raise the curve for low temperatures into the limits specified above for lithium.

The following nonlimiting examples will enable the specialist to have a better appreciation of the advantage of the ceramic compositions according to the present invention and to verify the flat nature of their epsilon=f(T) curve.

Figure 3:
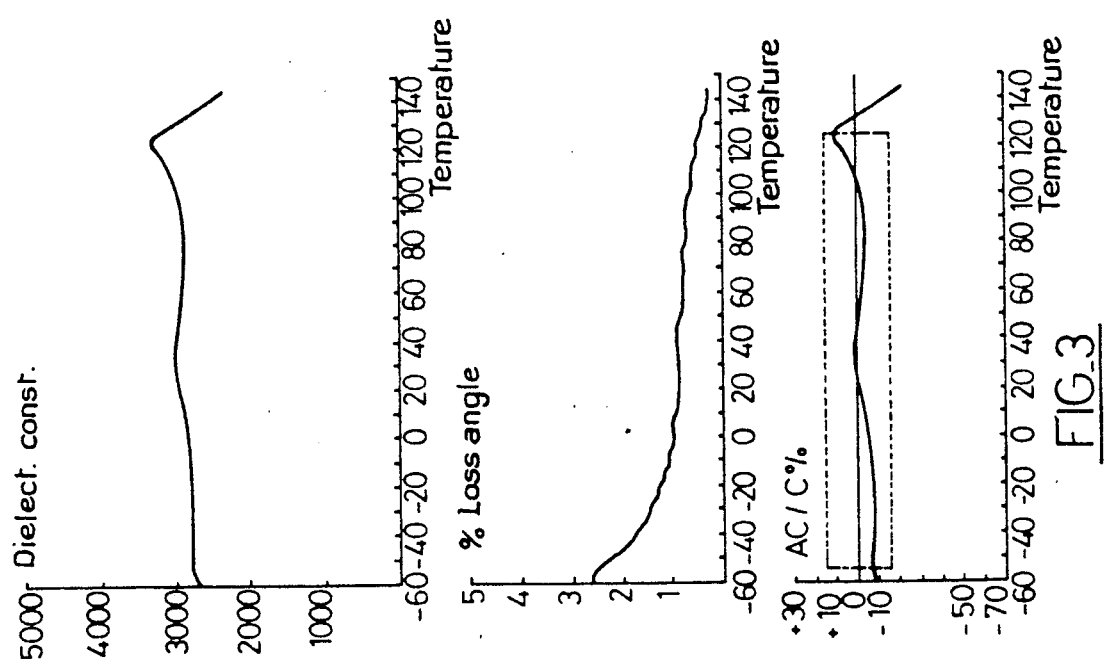

The results of the examples can be compared with the curves of the best dielectrics according to the prior art, which is represented by the curves of FIG. 3 relating to the case of $BaTiO_3$. These curves correspond to measurements carried out on a dielectric consisting of a mixture of $BaTiO_3$, of $Nb_2O_5$ (1.5% by weight) and of cobalt (0.1% by weight). This mixture was sintered at 1330° C. for 2 hours after a rate of temperature rise of 300° C./hour. These dielectric measurements were carried out according to the same procedures and with the same equipment as those employed in the following examples.

EXAMPLES

Generalities: a) manufacture of the samples for the examples:

a1) preparation of the initial phases

The materials to be sintered are prepared according to the usual techniques of the ceramists from oxides and/or carbonates mixed in a wet medium in an attritor (30 g of product for one hour) or ground in a powder mill (15 g for 1 hour).

The flow diagram for the preparation of the ceramic takes the form according to the outline enclosed as FIG. 11. It should be noted that the starting products are products with a purity of 99% or more, after loss on combustion. It is quite remarkable that a purity of only approximately 99% should permit such good results.

According to this process, the various constituents are weighed in the desired ratios. The mixing and the grinding are carried out as indicated above, either dry or in a wet medium. When this mixing-grinding has been carried out in a wet medium, it is advisable to add a drying operation under an infrared heater. The mixture is then converted into grog, that is to say that it is subjected to a presintering according to a temperature change profile which corresponds to a relatively fast rise (approximately 150° C./h) followed by a plateau and a decrease at a rate similar to that of the rise. The decrease gradient corresponds essentially to the inertia of the furnace.

Tetragonal bronzes are converted into grog at 1200° C. for approximately half a day, the rise and descent temperatures being 150° C. per hour. The compositions of the lead perovskite type are presintered at 800° C. for approximately half a day, the rise and descent temperatures are of the order of 200° C. per hour.

a2) After conversion into grog, these compounds (tetragonal bronzes and perovskites) are mixed in the proportion defined in the examples. This mixing is also a mixing-grinding in a mortar and in dry form. Once the grinding has been carried out, additives such as lithium or $BaLiF_3$ are incorporated. Forming is carried out by pressing into the form of disks of approximately 0.7 g which are pressed under one tonne/cm² ($10^8$ Pa). This forming is advantageously carried out in the presence of a binder whose function is merely to facilitate the forming of the disk. The binder plays no part of its own; it disappears by pyrolysis during the sintering. Mixtures of polyvinyl alcohol with water are generally employed.

In the examples which follow, a binder consisting of a mixture of polyvinyl alcohol sold under the registered trademark "Rhodoviol Prolabo" (5%) with water (95%) was employed. This polyvinyl alcohol has an apparent density, in g/ml, of 0.55, an ester value of 120 to 150 and a pH of 5 to 7. Its purity is 97.9%. This binder is added in a very small quantity, that is to say approximately 4 drops of solution per gram of powder, the mixing being performed in a mortar and the water being removed by drying under a radiant heater. The "Rhodoviol" is removed during the heating of the disks at about 300°–400° C. The sintering conditions are specified in each example.

b) measurement of the dielectric properties

The principal characteristics of a dielectric material capable of being employed in the production of a multilayer capacitor are:

the value of the dielectric constant at room temperature, the change of the dielectric constant epsilon as a function of time, the change in the loss angle tangent $\tan \delta = f(T)$ To facilitate this measurement, the sintered disks are metallized with the aid of an In-Ga (indium, gallium) eutectic alloy. This metallizing has the drainage of being capable of being performed at room temperature, but has the disadvantage of not being stable with time.

The metallizing can be carried out in two different ways:

complete metallizing of both surfaces of the disk or else complete metallizing of a single face; the other face is metallized in the center (0.7 cm).

This latter embodiment has the advantage of avoiding the delamination phenomena which can occur at the edges of the disks and consequently of having constants which are better relative to the former case.

A sample carrier capable of accommodating eight disks and a temperature probe sold under the name "platine 100" are placed in a thermostatted enclosure sold under the name of "Weiss Technik" which makes it possible to work between −80° and +180° C. The measurements are performed between 60° and 150° C. at a frequency of 1 kHz.

c) abbreviations explored in the examples : KSN denotes $K_2Sr_4Nb_{10}O_{30}$—PMN denotes $PbMg_{\frac{1}{3}}Nb_{\frac{2}{3}}O_3$—PFT denotes: $PbFe_{\frac{1}{2}}Ta_{\frac{1}{2}}O_3$—PMT denotes $PbMg_{\frac{1}{3}}Ta_{\frac{2}{3}}O_3$ and PFN denotes: $PbFe_{\frac{1}{2}}Nb_{\frac{1}{2}}O_3$ and BSKN-1 denotes: $Ba_3SrK_{1.5}Na_{0.5}Nb_{10}O_{30}$.

It should be remembered that, unless the contrary is stated, in the examples below the ratios involving the tetragonal bronzes and perovskites are expressed in moles, while the additions of lithium are expressed in weight percent.

EXAMPLES 1 TO 4:

The compositions of these examples are produced as indicated below. The composition of Example 1 was produced with 0.45 KSN, 0.55 PMT with the addition of 0.25% by weight of LiF. A result of the same type as with this composition can be obtained with the compositions $(1-x)KSN+xPMT+w$ % by weight of lithium salt, x being at least equal to approximately 0.4 and not exceeding approximately 0.7; w being lower than or equal to 1.5% by weight.

The optimum value of x does not exceed approximately 0.6 and is at least equal to approximately 0.5.

The results relating to the electrical properties of this compound are plotted as a continuous line in the curves of FIG. 1. The particularly flat nature of the curve of the dielectric constant as a function of temperature at a plateau value of approximately 3500 will be noted.

The composition of Example 2 was produced within the system $(1-x) KSN+x(zPFT+(1-z)PFN)+w$ % by weight of lithium salt with x included between approximately 0.4 and approximately 0.7 and z higher than or equal to approximately 0.6 and lower than or equal to 1; w being lower than or equal to 0.25% by weight, corresponding to the rule stated above, according to which the lithium content expressed as the weight of lithium oxide (even when lithium halide is involved) does not exceed approximately 1%. More specifically, the composition of Example 2 corresponds to 40 mol % of KSN and 60 mol % of a mixture itself consisting of 0.9 PFT and 0.1 PFN, with 1% by weight of lithium fluoride being added to the whole. This Example 2 corresponds to an optimum region of the above system. The electrical properties of this ceramic composition are plotted using short broken lines in FIG. 1. Comments which are quite similar to those in the case of Example 1 can be made, the plateau being in this case situated above 4000.

The composition of Example 3 was produced with 0.45% of KSN and 0.55% of PFT, 0.25% by weight of $Li_2CO_3$ being added to the whole. The electrical properties are shown in FIG. 1 in the case of the curves produced with the aid of broken lines forming long dashes. It will be noted that this composition gives particularly advantageous results, since a dielectric constant of 6000 between approximately 0° C. and 120° C. is practically attained.

Lastly, the composition of Example 4 corresponds to that of Example 3 in which KSN is replaced by BSKNN-1, that is to say a composition consisting of 0.45 of BSKNN-1 and 0.55% of PFT, with 0.25% by weight of $Li_2CO_3$ being added to the whole. The results are shown in FIG. 1 as a mixed line consisting of an alternation of long dashes and dots. The results are substantially similar to those obtained in the case of Example 2.

EXAMPLE 5

This example relates to the system $(1-x-y-z)KSN+xPFT+yBaTiO_3+zBaLiF_3+w$ % by weight of lithium salt with x higher than approximately 0.4 and lower than or equal to 0.7; with y lower than or equal to 0.05 and z lower than 0.02. It should be noted that $BaLiF_3$ is not considered as a lithium salt here but as a fluorinated perovskite, w is lower than or equal to 2% by weight.

The composition selected was produced from a mixture consisting of 0.45 of KSN, of 0.5 PFT, 0.04 $BaTiO_3$ and of 0.01 of $BaLiF_3$ with the addition of 1% by weight of $Li_2CO_3$. The sintering temperature was 1200° C. or 1250° C. for one hour as shown hereinafter. $BaTiO_3$ and $BaLiF_3$ were added in this example as a perovskite structure to try and raise the curve near the low temperatures.

In FIG. 2, the curves plotted as long dashes correspond to a center metallizing technique with sintering at 1250° C. for one hour. The solid line curve corresponds to a tablet metallized in the center without polishing with sintering at 1200° C. for one hour. Lastly, the curve consisting of short dashes corresponds to a complete metallizing without polishing and a sintering temperature of 1200° C. for one hour. It is noted that the best result with a dielectric constant in the region of 6000 is obtained by metallizing in the center and sintering at 1250° C. The least favorable result corresponds to a complete metallizing of the surface and has to do with delamination phenomena which can be produced at the edges of the disks, bearing in mind the particular method of forming the samples (uniaxial pressing).

EXAMPLE 6

This example shows the influence of the temperature. The compositions are produced from the following mixture: 0.45 moles of KSN and 0.55 moles of a mixture itself consisting of 0.77 of PMN and of 0.23 of PFN with the addition of 2% by weight of $Pb(Li_{0.4}W_{0.6})O_3$ and of 2% by weight of LiF. The solid line curve is obtained by sintering at 1150° C. for one hour and the short-dash curve is obtained by sintering at 1250° C. for one hour, the temperature rise being 150° C./hour; it can be seen that the solid line curve, corresponding to the lowest sintering temperature, yields the best result insofar as the value of the dielectric constant is concerned, whereas the curve corresponding to 1200° C. is much more uniform and much flatter. These curves are shown in FIG. 6. This example belongs to the group of compositions of the system $(1-x)KSN+x(zPMN+(1-z)PFN)+y$ % by weight of $Pb(Li_{\frac{1}{4}}W_{\frac{1}{82}})O_3+w$ % by weight LiF with x higher than 0.4 and lower than or equal to approximately 0.7; y being between 1 and 3%, preferably 1% and w being lower than or equal to 3% by weight. The optimum compositions are in the neighborhood of $x=0.5$; $z=0.77$; $y=2$% and $w=2$%.

EXAMPLES 7 AND 8

The subject of Examples 7 and 8 is compositions whose electrical properties are shown in FIG. 4. These compositions are both obtained by sintering at 1250° C. for one hour, the rate of temperature rise being 150° C.

The subject of Example 7 is a composition made up of 0.45 moles of KSN and of 0.55 moles of a mixture consisting of 0.86 of PMN and of 0.14 of a lithium-containing product half of which is made up of $Li_2CO_3$ and the other half of LiF, a composition whose electrical properties are shown in FIG. 4 using a solid line curve.

This composition is representative of a group of composition of formula $(1-x)KSN+x(zPMN+(1-z)[Li_2CO_3+LiF])$. The solid line curve therefore corresponds to the composition $x=0.45$ and $z=0.86$.

Example 8 corresponds to the system $(1-x)KSN+x(zPFT+(1-z)PFN)+w$ % by weight of $BaLiF_3$ with x lower than or equal to approximately 0.7 and higher than or equal to approximately 0.4; z lower than or equal to 1 and higher than or equal to 0.7 and w lower than or equal to 2%. The broken line curve corresponds to the values $x=0.5$; $z=0.8$; $w=1$% by weight.

EXAMPLE 9

The curves of this example are in FIG. 5.

The composition which is the subject of this example corresponds to the general formula of the Example 2, that is to say $(1-x)KSN+x(zPFT+(1-z)PFN)+w$ % by weight of lithium salt in which the values $x=0.55$; $z=1$ and $w=0.25$% by weight have been chosen, which corresponds to an optimum in the conditions of implementation of the process. The temperature rise is 200° C. per hour with a plateau at 1250° C. for 1 hour. A very uniform curve of the dielectric constant as a function of temperature between 0° and 140° C. can be seen, and this is at a remarkably high value, since the dielectric constant is 5250 in the case of the plateau value.

EXAMPLE 10

The curves relating to this example form FIG. 7.

This example corresponds to the general formula of Example 2, that is to say $(1-x)KSN+x(zPFT+(1-z)PFN)+w$ % by weight of lithium salt. This example refers to the particular values $x=0.55$; $z=1$; $w=0.25$% of $Li_2CO_3$ by weight. These compositions were produced at 1250° C. for two hours with a temperature rise of 200° C./hour. The solid curve corresponds to a metallizing in the center, the curves in short dashes and long dashes correspond to a complete metallizing. In the case of the first curve a remarkable high epsilon value (higher than 7000) of the dielectric constant is obtained with a remarkably flat curve between 10° and 140° C. The dielectric constant attains the exceptional value of 7100 as a variation of less than 20% in the range $+10-+125°$ C. (Z7C standard). The explanation of the drop in the constants when the disk is completely metallized was given in Example 5.

EXAMPLE 11

This example shows the part played by the sintering time within the system $(1-x)KSN+xPMN+w$ % by weight of LiF. The curves of FIG. 8 were obtained from the same single mixture consisting of 0.35 KSN, using 0.65 PMN to which 0.75% by weight of LiF was added; the mixture was heated to 1225° C. for one hour (solid line), two hours (short dashes) three hours (long dashes). The best results, at least so far as the value of the dielectric constant is concerned, are seen to be obtained with the shortest time. These curves are shown in FIG. 8.

EXAMPLE 12 (FIG. 9)

The curve corresponding to the composition 0.45 $KSN+0.5$ $PFT+0.05$ $BaTiO_3+2$% by weight of $BaLiF_3$, compared with Example 5, shows the ability of $BaLiF_3$ to shift the curve relatively towards the low temperatures.

The dielectric constant is of the order of 6000 at room temperature; this curve comes within the Y7P standard (+10% from $-30°$ C. to $+125°$ C.). A slight decrease in this curve is noted at high temperature, which is not the case in Example 5.

EXAMPLE 13 (FIG. 10)

This example shows the same effect of $(BaTiO_3)+BaLiF_3)$ on another system: 0.45 $KSN+0.5$ PMN.

The composition produced here: 0.45 $KSN+0.5$ PMN $+0.05$ $BaTiO_3+2$% by weight $BaLiF_3$ corresponds to a curve which is perfectly flat between 0° and 110° C. (Z6A class): variation lower than 1% between $+10$ and $+105°$ C.

What is claimed is:

1. A ceramic composition comprising at least one phase of tungsten tetragonal bronze structure and at least one phase of perovskite structure, in which said phases are bonded together by a solid solution of the tetragonal bronze structure.

2. The composition as claimed in claim 1, wherein the said solid solution contains lithium derivatives of a concentration lower than 2% by weight expressed as $Li_2O$.

3. The composition as claimed in claims 1 or 2 taken separately, wherein the said compositions are prepared from a mixture comprising the said phases, the molar ratio between the phases with a structure derived from perovskite and the phases with a structure derived from tungsten tetragonal bronze being between 2 and 0.5.

4. A process for the preparation of the ceramic compositions as claimed in claims 1 or 2, which comprises the following stages:
   a) grinding and mixing the phases constituting the ceramic composition,
   b) sintering at a temperature of between 1100° and 1300° C.

5. A process as claimed in claim 4, wherein the duration of the sintering is between ½ and 6 hours so as to avoid a homogenous solid solution being formed from the constituent phases.

6. The composition as claimed in claim 3 wherein ratio between said phased is between 1.5 and 1.

* * * * *